United States Patent [19]
Sasaki et al.

[11] Patent Number: 5,252,391
[45] Date of Patent: Oct. 12, 1993

[54] SURFACE TREATED SLIDING OR ROLLING CONTACT ELEMENT AND ROLLING BEARING

[75] Inventors: Masami Sasaki, Kawasaki; Koichi Hachiya, Zama, both of Japan

[73] Assignee: Nippon Seiko Kabushiki Kaisha, Tokyo, Japan

[21] Appl. No.: 807,419

[22] Filed: Dec. 13, 1991

Related U.S. Application Data

[63] Continuation of Ser. No. 444,750, Dec. 1, 1989, abandoned.

[30] Foreign Application Priority Data

Dec. 1, 1988 [JP] Japan ............................. 63-304645

[51] Int. Cl.$^5$ .............................................. B32B 15/04
[52] U.S. Cl. ................................... 428/336; 428/420; 428/457
[58] Field of Search .................... 428/457, 420, 336; 148/247

[56] References Cited

U.S. PATENT DOCUMENTS

| | | | |
|---|---|---|---|
| 4,351,678 | 9/1982 | Andrien et al. | 148/6.31 |
| 4,457,790 | 7/1984 | Lindert et al. | 148/247 |

FOREIGN PATENT DOCUMENTS

| | | |
|---|---|---|
| 57-78494 | 5/1982 | Japan . |
| 59-49297 | 3/1984 | Japan . |
| 63-293322 | 11/1988 | Japan . |
| 64-55419 | 3/1989 | Japan . |
| 1190987 | 5/1970 | United Kingdom . |
| 1352866 | 5/1974 | United Kingdom . |
| 2040367 | 8/1980 | United Kingdom . |
| 1600951 | 10/1981 | United Kingdom . |

OTHER PUBLICATIONS

Fukushima et al. vol. 39, No. 10 1988 pp. 618–619, "Surface Modification of Structural Matl's by Dynamic Ion Mixing Process".

Yatsui et al, Riken Symposium Abstract Papers 88-37, 1989, p. 21, "Surface Modification Experiments by Intense Pulsed Ion Beam".

Terashima et al, vol. 39, No. 10, 1988 pp. 592–593, "Surface Modification of Hard Electrodeposited Chromium by Nitrogen Implantation".

"The Adsorption and Thermal Decomposition of Tricresylphosphate (TCP) on Iron and Gold", Wheeler et al. *Applications of Surface Science* 18, (1984), pp. 106–122.

"The Effect of Tri-Cresyl-Phosphate Coating on Reducing Torques in Low Speed Bearings", MPB Corporation, C. H. Hannon, Sep. 1968.

"Friction and Wear Characteristics of Phosphate Esters at Sliding Contact (Part 1)", Yugi Yamatoto and Seigo Gondo, on or before Dec. 25, 1981.

*Primary Examiner*—Thomas J. Herbert, Jr.
*Attorney, Agent, or Firm*—Basile and Hanlon

[57] ABSTRACT

A surface treated sliding or rolling contact element, including a reaction product film of a 0.05 μm to 0.5 μm thickness which has been produced by a chemical treatment of the surface of the sliding or rolling contact element wherein the reaction product film is an inorganic and/or organometallic compound produced by a chemical reaction between a chemically active organic compound and the metal surface of the sliding or rolling contact element.

12 Claims, 1 Drawing Sheet

SURFACE TREATED SLIDING OR ROLLING CONTACT ELEMENT AND ROLLING BEARING

This application is a continuation of application Ser. No. 07/444,750, filed on Dec. 1, 1989, now abandoned.

BACKGROUND OF THE INVENTION

1. Field of the Invention

The present invention relates to a sliding or rolling contact element which is surface treated in order to reduce friction and wear between the contacting surfaces of two elements in sliding or rolling contact with each other and to increase the load carrying capacity and seizure resistance of each of the two elements. It also relates to a rolling bearing employing the rolling contact element.

2. Description of the Related Art

In normal bearing lubrication, the friction coefficient between two sliding or rolling contact surfaces of metal bodies changes with the absolute viscosity of lubricating oil used therewith, the bearing load and the rotational speed between the two sliding or rolling contact surfaces. In complete or full fluid lubrication in which a thick and continuous film of oil is formed in the interface between the two sliding or rolling contact surfaces, contact between the underlying surfaces of the two metal bodies will almost never take place so that the friction coefficient of the two sliding or rolling contact surfaces is very low. In mixed lubrication in which metal-to-metal contact partially takes place or in boundary lubrication in which a lubricant oil film is broken to thereby cause a few patches where metal-to-metal contact takes place, it is possible that surface damage, e.g., seizure of the sliding or rolling contact surfaces to be lubricated will take place. In order to prevent this damage, various types of lubricant additives (e.g., an oiliness agent, an extreme-pressure agent and an antiwear agent) have been employed.

The interface between the contacting surfaces of the two metal bodies is at high temperature and high pressure so as to be in a high reactive condition. A lubricant additive (an organic compound with chlorine, sulfur or phosphorus, e.g., chlorinated paraffin, dibenzyl sulfide or tricresyl phosphate) introduced into the area of contact readily reacts with a bearing metal.

As a result of this reaction, inorganic or organometallic compounds with each element (e.g., metal chloride, metal sulfide, metal phosphate, etc.) are produced on the contacting surfaces of the two metal bodies. The reaction products are considered to prevent the seizure and wear between the contacting surfaces of the two metal bodies. However, an immediate effect of the lubricant additive cannot be achieved since a considerable amount of time is required for the start of a reaction between the lubricant additive and the contacting or frictional surfaces of the two metal bodies.

In the prior art, there are some examples in which a sliding or rolling contact element is previously surface treated with a lubricant additive, e.g., tricresyl phosphate (i.e., TCP).

However, there has not yet been an established theory of the effect when the sliding or rolling contact element is previously surface treated with a lubricant additive, so that this effect can only be variously estimated.

In particular, this effect under a severe condition in which a supply of lubricating oil is frequently interrupted during operation of the sliding or rolling contact element has not been discussed. That is, the thickness of a surface treated layer of the lubricant additive formed on the sliding or rolling surface by the prior art is as thin as less than 0.05 μm measured by X-ray photoelectron spectroscopy (i.e., XPS, described later). The present invention carried out a superhigh speed four ball test in order to study an improvement in the lubricating property of a bearing caused by such a thin surface treated layer. This superhigh speed four ball test is a kind of extreme-pressure test essentially equal to ASTM D-2783. The rotational speed of the vertical shaft of a superhigh speed four ball tester can be increased up to 20,000 rpm while that of a four ball tester according to ASTM D-2783 can be increased up to 1,770 rpm. The superhigh speed four ball test disclosed that the surface treated layer as thin as less than 0.05 μm would not improve the extreme-pressure property, in particular, under the severe condition in which, for example, the supply of lubricating oil was interrupted.

Another surface treatment of the bearing metal with an inorganic compound, e.g., zinc phosphate or manganese phosphate instead of the above mentioned reaction product of the lubricant additive, has been attempted. In this case, there is a problem in that this inorganic compound causes corrosion in the bearing metal surfaces. In addition, the thickness of the surface treated layer of this inorganic product is above 0.5 μm. The superhigh speed four ball test applied to this surface treated layer of the inorganic product disclosed that the surface treated layer of this inorganic product failed to improve the extreme-pressure property.

Thus, the prior art failed to sufficiently disclose an effective thickness of the surface treated layer formed on each of the two contacting surfaces, so that a sufficient improvement in the lubricating property caused by the surface treatment applied to the sliding or rolling contact element was not achieved.

SUMMARY OF THE INVENTION

The present invention has been made in view of the above-described problems. An object of the present invention is to provide a sliding or rolling contact element and a rolling bearing having a low friction property, a low wear property, a load carrying capacity and a seizure resistance that are sufficiently improved.

In order to achieve this object, the metal surface of the sliding or rolling contact element is chemically treated or modified so that a 0.05 μm to 0.5 μm thick reaction product film is formed on the surface of the sliding or rolling contact element. The reaction product film is an inorganic and/or organometallic compound film of a submicron thickness which is produced by a chemical reaction between a chemically active organic compound and the metal surface of the sliding or rolling contact element and which possesses a characteristic different from that of the bulk or underlying body of the sliding or rolling contact element. The thickness of the reaction product film preferably is in the range of 0.05 μm to 0.3 μm and, in particular, 0.1 μm.

The above mentioned reaction product film is made of at least one of phosphorus, sulfur and chlorine compounds. That is, the reaction product film is made of at least one of inorganic and/or organometallic films which are produced by reactions between organic compounds (organophosphorus compounds, organosulfur compounds, organochlorine compounds, and organometal compounds and a metal of the sliding or rolling contact element. In particular, the reaction product film preferably is produced from a reaction between a mixture of organophosphorus compound and organosulfur compound and the sliding or rolling contact element.

The film of the reaction product with the phosphorus element comprises reaction product films produced by reactions between at least one of phosphite esters, phosphate esters, and acid phosphate esters and the metal of the sliding or rolling contact element.

The film of the reaction product with the sulfur element comprises reaction product films produced by reactions between at least one of sulfurized fat and oil, sulfurized olefin, mercaptans, sulfides, sulfoxides, and sulfones and the metal of the sliding or rolling contact element.

The film of the reaction product with the chlorine element comprises reaction product films produced by reactions between chlorinated paraffins, and/or chlorinated fats and oils and the metal of the sliding or rolling contact element.

The film of the organometal reaction product with the organometal comprises reaction product films produced by reactions between at least one of metal dihydrocarbyl dithiophosphates, metal dihydrocarbyl dithiophosphates, and naphthenic acid metal salts and the metal of the sliding or rolling contact element.

A rolling bearing of the present invention has at least one of a retainer, inner and outer races and a rolling element made of the rolling contact elements having various reaction product films of the present invention.

According to the present invention, at least one of two contacting surfaces of the sliding or rolling contact elements is subjected to a chemical treatment so that a 0.05 $\mu$m to 0.5 $\mu$m thick reaction product film is formed on that contacting surface. A sliding or rolling contact element and rolling bearing of the present invention has a low friction property, a low wear property, and sufficiently improved load carrying capacity and seizure resistance.

DESCRIPTION OF THE PREFERRED EMBODIMENTS

Figure 1:
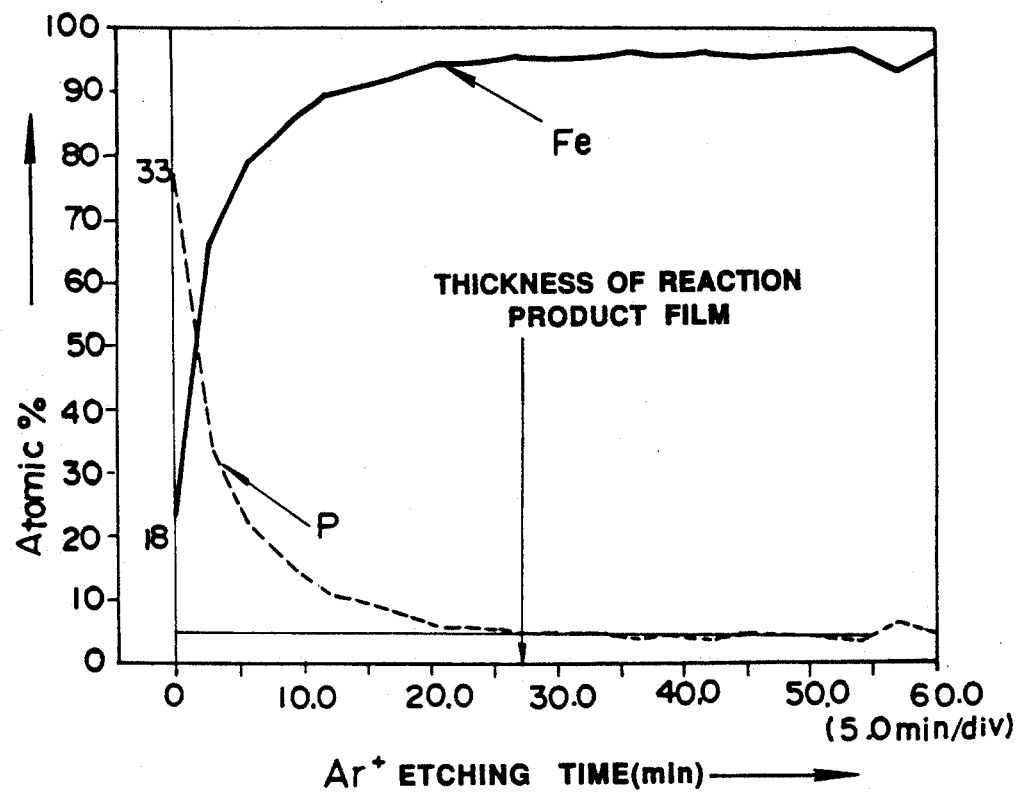
FIG. 1 is a graph illustrating one example of a measurement of the thickness of a film of a phosphorus-containing reaction product with the phosphorus element of the present invention.

Hereinafter, the present invention will be described in detail. The thickness of the reaction product film is measured by an X-ray photoelectron spectrophotometer (abbreviated to XPS). The XPS transmits X-rays to a sample surface and analyzes the energy of a photoelectron emitted from the outermost surface ($\approx$ several Å) to produce data of a surface element and its chemical state. Also, the XPS measures the thickness of the reaction product film while an argon (Ar) ion gun spatters the surface of the sample to thereby analyze the distribution of the depth of the element of the reaction product film.

FIG. 1 is a graph illustrating one example of the measurement of the thickness of the reaction product film produced by the organophosphorus compound (e.g., tridecyl acid phosphate). The thickness of the reaction product film is defined in terms of the depth profile of the sample taken by the XPS immediately before the phosphorus content of the reaction product film is changed (as shown in FIG. 1, an Ar$^+$ etching time is 27 min). In this case, since the etching rate is 3 nm/min, the thickness of the reaction product film is about 0.8 $\mu$m (i.e., 27 min$\times$3 nm/min).

Control of the concentration of the compound in solution, the reaction temperature and the reaction time of a reaction between a compound and the sliding or rolling contact element carried out in response to the kind of the compound can cause an adjustment of the thickness of the reaction product film as defined above.

The reaction product film was formed by a reaction between the sliding or rolling contact element and at least one of an organophosphorus compound, organosulfur compound, organochlorine compound and organometallic compound. The reaction product film which is produced by a reaction between the sliding or rolling contact element and the organophosphorus compound is referred to as the organophosphorus compound-reaction product film. The reaction product film which is produced by a reaction between the sliding or rolling contact element and the organosulfur compound is referred to as the organosulfur compound-reaction product film. The reaction product film which is produced by a reaction between the sliding or rolling contact element and the organochlorine compound is referred to as the organochlorine compound-reaction product film. The reaction product film which is produced by a reaction between the sliding or rolling contact element and the organometallic compound is referred to as the organometallic compound-reaction product film.

The organophosphorus compound used for producing the organophosphorus compound-reaction product film comprises phosphite esters, phosphate esters and acid phosphate esters.

The phosphite esters comprise phosphite esters derived from $C_1$ to $C_{18}$ hydrocarbyl groups (e.g., alkyls, phenyls, benzyls, cresyls, cinnamyls and aryls). For example, trioctyl phosphite, triphenyl phosphite, tricresyl phosphite, bis-2-ethyl hexyl phosphite, tridecyl phosphite, dibuthyl hydrogen phosphite, tris(nonyl phenyl) phosphite, dilauryl hydrogen phosphite, diphenyl monodecyl phosphite, trilauryl trithiophosphite and diphenyl hydrogen phosphite are preferable.

The phosphate esters comprise phosphate esters derived from $C_1$ to $C_{20}$ hydrocarbyl groups. For example, triphenyl phosphate, triethyl phosphate, tributhyl phosphate, tris(2-ethyl hexyl) phosphate, tridecyl phosphate, diphenyl mono(2-ethyl hexyl) phosphate, tricresyl phosphate, trioctyl phosphate, tristearyl phosphate are preferable.

The acid phosphate esters comprises $C_1$ to $C_{20}$ mono- or dihydrocarbyl acid phosphates. For example, methyl acid phosphate, isopropyl acid phosphate, buthyl acid phosphate, 2-ethyl hexyl acid phosphate, isodecyl acid phosphate, tridecyl acid phosphate, lauryl acid phosphate are preferable.

The organosulfur compound used for producing the organosulfur compound-reaction product film comprises sulfurized fats and oils (e.g., sulfurized sperm oil, sulfurized olefin), mercaptans, sulfides, sulfoxides and sulfones.

The olefin sulfides comprise sulfides derived from $C_3$ to $C_8$ olefin sulfides or low molecular-weight polyolefin sulfides derived from $C_3$ to $C_8$ olefins. For example, penten sulfide, butylene sulfide and octene sulfide are preferable.

The mercaptans comprise $C_4$ to $C_{20}$ alkyl mercaptans and $C_4$ to $C_{20}$ mercaptofatty esters. For example, n- butyl mercaptan, isobutyl mercaptan, tertiary butyl mercaptan, n-octyl mercaptan, tertiary nonyl mercaptan, tertiary dodecyl mercaptan, butyl thioglycolate, ethyl thiopropinate and octyl 3-mercaptopropionate are preferable.

The sulfides comprises monosulfides (—S—) with $C_4$ to $C_{20}$ hydrocarbyl groups, disulfides (—S—S—) with $C_4$ to $C_{20}$ hydrocarbyl groups, and polysulfides (—S—S—S—) with $C_4$ to $C_{20}$ hydrocarbyl groups. For example, dibutyl monosulfide, dibutyl disulfide, diphenyl sulfide and dibenzyl sulfide are preferable.

The sulfoxides comprise sulfoxides with $C_4$ to $C_{20}$ hydrocarbyl groups. For example, dibutyl sulfoxide and dibenzyl sulfoxide are preferable.

The sulfones comprise sulfones with $C_4$ to $C_{20}$ hydrocarbyl groups. For example, dibutyl sulfone, didodecyl sulfone and phenyl sulfone are preferable.

The organochlorine compound used for producing the organochlorine compound-reaction product film comprises chlorinated paraffins and chlorinated fats and oils.

The chlorinated paraffins comprises, e.g., n-octyl chloride, paraffin chloride, octadecyl chloride. The chlorinated fats and oils comprise, e.g., chlorinated sperm oil.

The organometallic compound used for producing the organometallic compound-reaction product film comprises metal dihydrocarbyl dithiophosphates, metal dihydrocarbyl dithiocarbamates and naphthenates.

The metal dihydrocarbyl dithiophates comprise the group of metal dihydrocarbyl dithiophosphates each of which includes on of $C_4$ to $C_{20}$ hydrocarbyl groups. For example, zinc dimethyl dithiophosphate, zinc butyl isooctyl dithiophosphate, zinc di(4-methyl-2-pentyl) dithiophosphate, zinc di(tetrapropenyl phenyl) dithiophosphate, zinc (2-ethyl-1-hexyl) dithiophosphate, zinc (isooctyl) dithiophosphate, zinc (ethyl phenyl) dithiophosphate, zinc (amyl) dithiophosphate, and zinc di(hexyl) dithiophosphate. In addition to the above, zinc dihydrocarbyl dithiophosphates, lead(Pb), cadmium(Cd), antimony(Sb) and molybdenum(Mo) dihydrocarbyl dithiophosphates are preferable.

The metal dihydrocarbyl dithiocarbamates comprise the group of metal dihydrocarbyl dithiocarbamates each of which includes one of $C_4$ to $C_{20}$ hydrocarbyl groups. For example, zinc dimethyl dithiocarbamate, zinc butyl isooctyl dithiocarbamate, zinc di(4-methyl-2-pentyl) dithiocarbamate, zinc di(tetrapropenyl phenyl) dithiocarbamate, zinc (2-ethyl-1-hexyl) dithiocarbamate, zinc (isooctyl) dithiocarbamate, zinc (ethyl phenyl) dithiocarbamate, zinc (amyl) dithiocarbamate and zinc di(hexyl) dithiocarbamate. In addition to the above, zinc dihydrocarbyl dithiocarbamates, lead(Pb), cadmium(Cd), antimony(Sb) and molybdenum(Mo) dihydrocarbyl dithiophosphates are preferable.

The naphthenates comprise naphthenic acid metal salt. For example, lead naphthenate is preferable.

The various compounds producing the reaction product films may be employed directly or under a condition in which the compounds are dissolved in oil or a solvent and diluted in a concentration range of 0.1 to 100 wt %. For example, refined paraffinic oil and diphenyl oil may be employed as the oil and benzene, toluene, hexane and the like may be employed as the solvent. Nonpolar oils and solvents are preferable.

In the formation of the reaction product film, the organophosphorus compound, the organosulfur compound, the organochlorine compound and the organometallic compound of a predetermined concentration were employed alone or in a mixture thereof. In particular, it was found that when the organophosphorus compound and organosulfur compound were mixed, an interaction therebetween promoted the formation rate of the reaction product film. In the same kind of organophosphorus compound, organosulfur compound or organochlorine compound, corresponding specific organic compounds were used separately or in combination.

In response to the kind and content of each of the specific organic compounds used separately or in combination, a corresponding reaction product film containing phosphorus, sulfur, chlorine, organic metal or at least two of these elements is formed on the surface of the sliding or rolling contact element.

The sliding or rolling contact element to be treated or modified is immersed in a solution of the organophosphorus compound, the organosulfur compound, the organochlorine compound, the organometallic compound or a mixture thereof, the concentration of which is adjusted to be above-described predetermined value. The reaction between the metal of the sliding or rolling contact element and this organic compound proceeded for a predetermined period of time in the range of 0.5 hours to 8 hours so that a reaction temperature is controlled to a predetermined level in the range between room temperature and 120° C. Thus, the reaction product film of a 0.05 $\mu$m to 0.5 $\mu$m thickness was formed on the surface of the sliding or rolling contact element. In other words, the concentration of the solution of this organic compound, the temperature, and the time of the reaction between the metal of the sliding or rolling contact element and the solution of this organic compound are controlled so that the thickness of the reaction product film formed on the sliding or rolling contact element falls within the range of 0.05 $\mu$m to 0.5 $\mu$m.

In the formation process of the reaction product film, the use of an ultrasonic wave at a predetermined temperature improved the uniformity of the reaction product film and increased the rate of the reaction between the metal of the sliding or rolling contact element and the organic compound.

The superhigh speed four ball test was applied to rolling contact elements which were surface treated and had reaction product films of various thicknesses formed on the surfaces of the rolling contact elements. When the thickness or each of the reaction product film was below 0.05 $\mu$m and above 0.5 $\mu$m, seizure between the surfaces of the rolling contact elements and an oscillation took place. On the other hand, when the thickness of the reaction product film was in the range of 0.05 $\mu$m to 0.5 $\mu$m and, in particular, preferably 0.05 $\mu$m to 0.3 $\mu$m, the superhigh speed four ball test experimentally disclosed that very good results in the low friction property, the low wear property, the load carrying capacity and the seizure resistance of the rolling contact element were obtained.

At least a single sliding or rolling contact surface of the sliding or rolling contact element may be subjected to the surface treatment of the present invention. Of course, other portions of the sliding or rolling contact element may be also subjected to the surface treatment of the present invention. When the contacting surface of at least one of two sliding or rolling contact elements is subjected to the surface treatment of the present invention, the sufficiently improved low friction property, low wear property, load carrying capacity and seizure resistance

DESCRIPTION OF THE EXAMPLES

Example 1

Bearing steel balls of a ½ inch diameter having respective reaction product films of six thickness produced by phosphate ester were prepared. Then, the superhigh speed four ball test was applied to the bearing steel balls of Example 1. Tridecyl acid phosphate (i.e., a mixture of tridecyl monoacid phosphate and tridecyl diacid phosphate) having a high-reactivity was employed as the phosphate ester.

The composition and physical properties (e.g., mechanical strength, adherence, uniformity and lubrication property) of each of the reaction product films depends on the chemical structure of the hydrocarbyl group of the acid phosphate ester ($R = C_1$ to $C_{20}$, this ester may be an aliphatic or aromatic compound or a mixture thereof) and the concentration in oil or a solvent. The thickness of each of the reaction product films depends on a surface treatment temperature and time. Therefore, conditions of the reaction between the bearing steel balls and the tridecyl acid phosphate were determined in view of the concentration, surface treatment temperature and time.

In Example 1, the steel balls were immersed in a solution in which tridecyl acid phosphate was diluted by a refined oil to have a 5 wt % concentration and reacted with the solution at 40° C. for 4 hours, so that a reaction product film of an about 0.3 μm thickness was formed on the ball surfaces.

Thus, reaction temperature and time were controlled so that the reaction product films of 0.01 μm, 0.05 μm, 0.1 μm, 0.3 μm, 0.5 μm and 0.8 μm thicknesses were formed on the ball surfaces, respectively.

The following Table 1 shows the results of the superhigh speed four ball test applied to the samples which are surface treated as described above.

In Example 1, the rotational speed was increased until the speed caused seizure at rate of 1000 rpm/min under the oil temperature shown in Table 1 and load.

TABLE 1

|  | Oil temperature °C. | Max Hertg pressure GPa | Seizure occurrence rotational speed rpm |
| --- | --- | --- | --- |
| Untreated | 120 | 3.0 | 6,000 |
| 0.01 μm | 120 | 3.0 | 7,000 |
| 0.05 μm | 120 | 3.0 | 10,000 |
| 0.1 μm | 120 | 3.0 | 12,500 |
| 0.3 μm | 120 | 3.0 | 11,000 |
| 0.5 μm | 120 | 3.0 | 10,000 |
| 0.8 μm | 120 | 3.0 | great oscillation |

The seizure resistance of the bearing steel ball having the reaction product film of a 0.01 μm thickness order was essentially equal to that of the un-surface treated bearing steel ball. The seizure resistance of the bearing steel ball having the reaction product film of the 0.8 μm thickness could not be measured since a great oscillation took place.

On the other hand, the seizure resistance of each of the bearing steel balls having the reaction product films of 0.05 μm to 0.5 μm thicknesses was significantly increased. In particular, the seizure resistance of the bearing steel ball having the reaction product film of 0.1 μm thickness was best.

Example 2

Bearing steel balls of the ½ inch diameter having respective reaction product films of six thicknesses produced by the same phosphate ester as in Example 1 were prepared. Then, the superhigh speed four ball test was applied to the bearing steel balls of Example 2.

In Example 2, the supply of lubricating oil was interrupted. This interruption was carried out as follows: 1) A 1-minute break-in was carried out at the pv value of 600 kgf/mm$^2$.m/s in an oil bath of a temperature of 120° C. 2) After the passage of 1 minute, the lubricating oil of the oil bath was immediately exhausted and the period of time up to the occurrence of a seizure of the bearing steel ball was measured. The following Table 2 shows the results of the superhigh speed four ball test:

TABLE 2

|  | Time up to occurrence of seizure |
| --- | --- |
| Untreated | 0'00" |
| 0.01 μm | 0'40" |
| 0.05 μm | 1'40" |
| 0.1 μm | 3'00" |
| 0.3 μm | 2'27" |
| 0.5 μm | 2'00" |
| 0.8 μm | 1'00" |

When the thickness of the reaction product film was 0.8 μm, a great oscillation took place during the operation of the superhigh speed four ball test and the bearing steel ball experienced a large friction. On the other hand, when the thickness of the reaction product film was 0.05 μm, the friction coefficient of the bearing steel ball was relatively low.

Even under a severe condition in which the lubrication oil was exhausted, it was apparent that the effect of each of the reaction product films formed on the surface of the bearing steel ball was very advantageous. In particular, the seizure resistance of the bearing steel ball having the reaction product film of 0.1 μm thickness was best.

Example 3

Tapered rollers of steel of a tapered roller bearing (the outer diameter: 52 mm and the inner diameter: 25 mm) having respective reaction product films of various thicknesses produced by the same phosphate ester as in Example 1 were prepared. Then, a temperature increase of the bearing having each of the tapered rollers was measured under conditions of 100N radial load, a 1,500N axial load, a 3,000 rpm rotational speed and a very small content of oil, i.e., oil plating.

The following Table 3 shows the results of the bearing tapered roller of Example 3:

TABLE 3

|  | Temperature increase of outer race (deg. C.) |
| --- | --- |
| Untreated | 100 |
| 0.01 μm | 98 |
| 0.1 μm | 60 |
| 0.3 μm | 72 |
| 0.5 μm | 74 |
| 0.8 μm | 97 great oscillation |

With temperature increase, it was apparent that the temperature increase of each of the tapered rollers having the reaction product films of 0.1 μm to 0.5 μm thicknesses was about 30 to 40 deg. C. lower than those of the untreated tapered roller and the tapered rollers having the reaction product films of 0.01 μm and 0.8 μm. In particular, the temperature increase of the tapered roller having the reaction product film of 0.1 μm thickness was best to reflect a low friction of the reaction product film of 0.1 μm thickness. Such results were also obtained on a ball bearing.

Example 4

Zinc hydrocarbyl dithiophosphate including 20.7% sulfur in a molecule thereof was diluted in a refined oil to have a 1 wt % concentration therein. A bearing steel ball of the ½ inch diameter was immersed in this zinc hydrocarbyl dithiophosphate solution and reacted at 120° C. for 24 hours. Thus, the reaction product film of 0.1 μm thickness was produced.

The period of time up to the occurrence of a seizure was measured on the sample thusly produced under the same conditions as in Example 2. This measurement provided a one hour, ten minute seizure occurrence time.

Example 5

Tert-octyl disulfide, a disulfide including two sulfurs in a molecule thereof, was diluted in a refined oil so as to have a 50 wt % concentration. A ½ inch bearing steel ball was immersed in the tert-octyl disulfide solution and reacted at 60° C. for 4 hours. Thus, the reaction product film of 0.1 μm thickness was formed on the surface of the ½ inch bearing steel ball. The period of time up to the occurrence of a seizure was measured on the sample thusly produced under the same conditions as in Example 2. This measurement provided a one hour, thirty minute seizure occurrence time.

Example 6

N-octyl chloride was diluted by a refined oil so as to have a 50 wt % concentration. A ½ inch bearing steel ball was immersed in this n-octyl chloride solution and reacted at 60° C. for 4 hours. Thus, the reaction product film of 0.1 μm thickness was formed on the surface of the ½ inch bearing steel ball. The period of time up to the occurrence of a seizure was measured on the sample thusly produced under the same conditions as in Example 2. This measurement provided a one hour, thirty-five minute seizure occurrence time.

Example 7

Since it was found that the organosulfur compound and organophosphorus compound interacted with each other so that a reaction for forming the reaction product film was promoted, a ½ inch bearing steel ball was immersed in a mixture of a 5 wt % trioctyl phosphate, a 5 wt % tridecyl acid phosphate constituting a kind of phosphoric acid and a 5 wt % di-tert-octyl disulfide and reacted at 60° C. for 2 hours. Thus, the reaction product film of 0.1 μm thickness was formed on the surface of the ½ inch bearing steel ball. The period of time up to the occurrence of a seizure was measured on the sample thusly produced under the same conditions as in Example 2. This measurement provided a three hour, twenty minute seizure occurrence time. This value is better than that of Example 2.

Example 7 discloses that even when different organic compounds were mixed to form the reaction product film on the surface of the sample, the sliding or rolling contact element with this film had a good seizure resistance.

The surface treatment of the present invention is applicable not only to the ball or roller of the rolling bearing; but also to, e.g., the groove surfaces of the inner and outer races and the retainer surface of the rolling bearing. A rolling bearing including at least one of these elements had a very good load carrying capacity and seizure resistance, thereby was sufficiently employed even under a severe condition in which the supply of lubricating oil was interrupted during the operation of the rolling bearing.

What is claimed is:

1. A surface modified sliding or rolling contact element, comprising:
   a reaction product film having lubricating properties and having a 0.05 μm to 0.3 μm thickness formed in the surface of a metal sliding or rolling contact element wherein the reaction product film has been provided beforehand in the surface by a chemical reaction between a chemically active organic compound and the metal surface of the sliding or rolling contact element;
   wherein the reaction product film comprises at least one of a phosphorus compound reaction product film, a sulfur compound reaction product film, and a chlorine compound reaction product film, which has been produced by a reaction between the sliding or rolling contact element and the corresponding one of an organophosphorus compound, an organosulfur compound, and an organochlorine compound.

2. The surface modified sliding or rolling contact element as recited in claim 1 wherein the thickness of the reaction product film is 0.1 μm.

3. The surface modified sliding or rolling contact element as recited in claim 1 wherein the phosphorus compound reaction product film comprises a reaction product film in which the sliding or rolling contact element has reacted with at least one of phosphite esters, phosphate esters and acid phosphate esters.

4. The surface modified sliding or rolling contact element as recited in claim 1 wherein the sulfur compound reaction product film comprises a reaction product film in which the sliding or rolling contact element has reacted with at least one of sulfurized fats and oils, sulfurized olefins, mercaptans, sulfides, sulfoxides and sulfones.

5. The surface modified sliding or rolling contact element as recited in claim 1 wherein the sulfur compound reaction product film comprises a reaction product film in which the sliding or rolling contact element has reacted with di-tert-octyl disulfide.

6. The surface modified sliding or rolling contact element as recited in claim 1 wherein the chlorine compound reaction product film comprises a reaction product film in which the sliding or rolling contact element has reacted with one of chlorinated paraffins and chlorinated fats and oils.

7. A rolling bearing, wherein at least one of a retainer, inner and outer races and a rolling element of the rolling bearing is made of a rolling contact element formed according to claim 1.

8. The surface modified sliding or rolling contact element as recited in claim 1 wherein the phosphorus compound reaction product film comprises a reaction product film in which the sliding or rolling contact element has reacted with acid phosphate esters.

9. The surface modified sliding or rolling contact element as recited in claim 1 wherein the reaction product film comprises a reaction product film in which the sliding or rolling contact element has reacted with a mixture of the organophosphorus compound and the organosulfur compound.

10. The surface modified sliding or rolling contact element as recited in claim 9 wherein the reaction product film comprises a reaction product film in which the sliding or rolling contact element has reacted with a mixture of tridecyl acid phosphate and di-tert-octyl disulfide.

11. The surface modified sliding or rolling contact element as recited in claim 1 wherein the phosphorus compound reaction product film comprises a reaction product film in which the sliding or rolling contact element has reacted with tridecyl acid phosphate.

12. The surface modified sliding or rolling contact element as recited in claim 11 wherein the organochlorine compound reaction product film comprises a reaction product film in which the sliding or rolling contact element has reacted with n-octyl chloride.

* * * * *